Sept. 3, 1968      A. P. ZOB      3,400,246

DUAL-INPUT ELECTRIC SIDE-ARM WATER HEATER

Filed Oct. 18, 1965      2 Sheets-Sheet 1

*INVENTOR.*
ALMOS PETER ZOB
BY~ *Maybee & Legris*
ATTORNEYS

Sept. 3, 1968  A. P. ZOB  3,400,246
DUAL-INPUT ELECTRIC SIDE-ARM WATER HEATER
Filed Oct. 18, 1965  2 Sheets-Sheet 2

INVENTOR.
ALMOS PETER ZOB
BY~ Maybee & Legris
ATTORNEYS

3,400,246
DUAL-INPUT ELECTRIC SIDE-ARM WATER HEATER
Almos Peter Zob, 8 Oakwood Ave. N.,
Port Credit, Ontario, Canada
Filed Oct. 18, 1965, Ser. No. 497,364
6 Claims. (Cl. 219—297)

ABSTRACT OF THE DISCLOSURE

A side-arm water heater has a single electric heating element located in the side-arm. A thermostat responsive to water temperature at the downstream end of the side arm, controls the power supply to the heating element at two different power levels having a ratio to each other of between about 3:1 and about 4:1 through a power varying device. The power can be varied by changing the input voltage or by changing the resistance of the heating element. Another thermostat located at the bottom of the tank adjacent the inlet to the side-arm, de-energizes the heating element when the water has reached a desired temperature.

---

Figure 1:
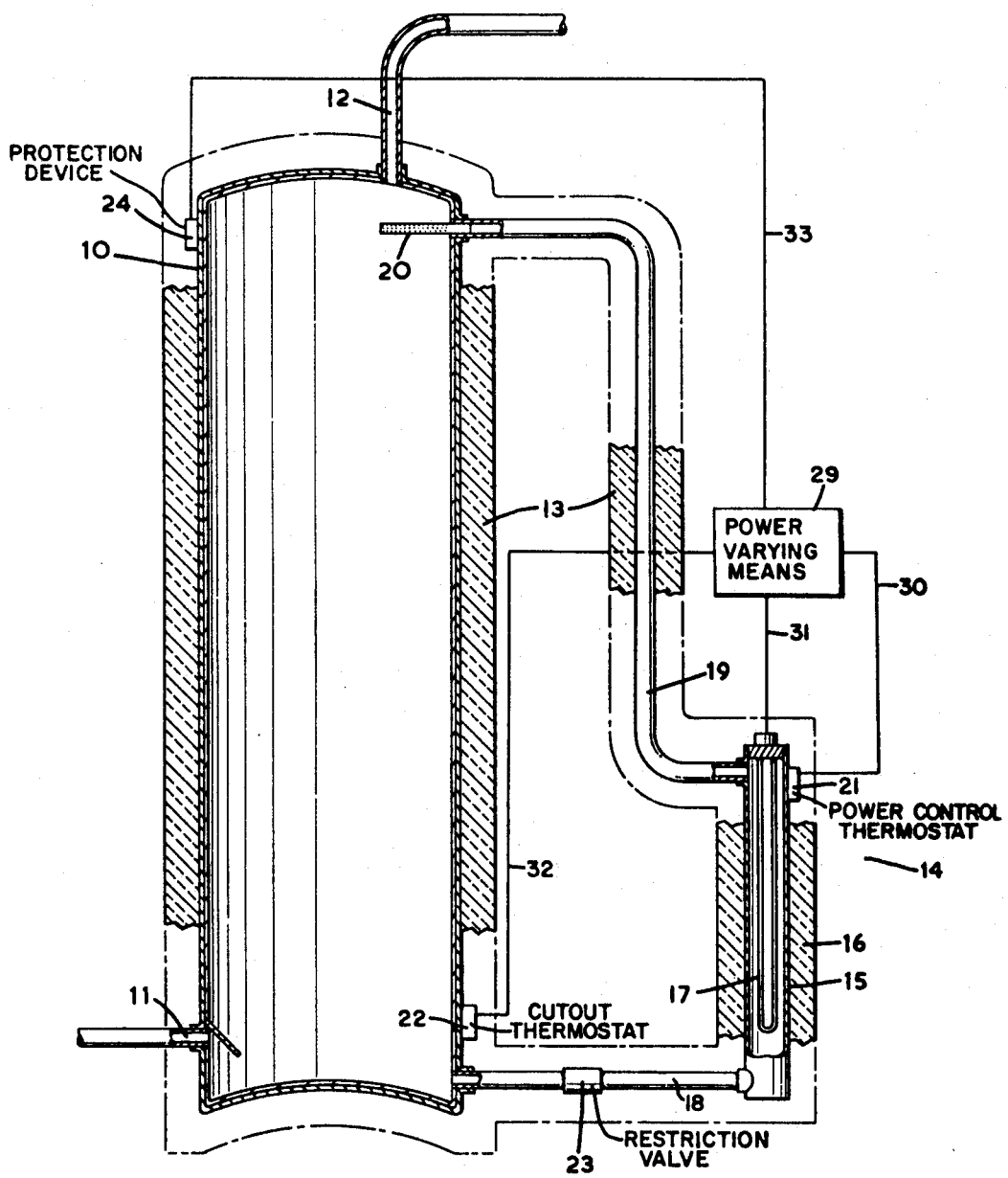

This invention relates to an electric heater for fluids and in particular to an improved electric water heater of the side-arm kind.

Electric water heaters of the kind which include a storage tank for hot water may be divided into two general groups, according to the method of heat transfer between a heating element and water stored in the tank. In the first group, heat is transferred directly to the stored water, for example by means of an immersion element which extends into the tank. In the second group, only a relatively small volume of water is heated directly and heat is transferred to the tank by circulating the water in the tank through the heating means. A typical example of the second group is the side-arm water heater, wherein a constant input heating element is provided in a side-arm through which water in the tank can circulate, e.g. by density changes in the water due to heating. The side-arm is usually an external substantially vertical pipe that is connected at its ends to the storage tank.

In order to achieve fast recovery (i.e. to promptly provide a fresh supply of hot water after a withdrawal of hot water) it is usual in immersion heaters to provide two heating elements, one near the bottom of the tank and of relatively low input rating, the other near the top of the tank and of relatively high input rating. Immediately after a large withdrawal additional heat is supplied to the water near the top of the tank by the upper heating element which is switched off after a sufficient quantity of hot water has been heated to the desired temperature.

Since the heating elements in an immersion heater are in direct contact with the water in the tank it usually requires a relatively long time to provide hot water at the required temperature from a cold start because of the large volume of water in contact with the elements. This problem can be overcome to some extent by providing an upper heating element of high rating, but such heating elements are relatively expensive and increase the peak power demand of the heater. Side-arm heaters, however, have the advantage of providing hot water at the required temperature in a relatively short time from a cold start because of the small volume of water in contact with the elements.

It is now proposed to vary the power input to a heating element of an electric heater of the side-arm kind in cycles between two power levels in response to temperature variations of the heated water in the side-arm and it has been found that an electric heater so constructed produces hot water at a nearly constant temperature, has good recovery and results in a maximum power demand for a large group of water heaters embodying the invention which is considerably lower than for a similar group of dual element water heaters. Instead of requiring two separate heating elements as in the usual immersion heater, the heater of the present invention requires only a single heating element. The power input to the heating element can be varied by changing the input voltage or by changing the resistance of the heating element.

It is an object of the present invention to provide a dual-input side-arm water heater producing hot water at a nearly constant temperature.

It is a further object of the invention to provide a novel side-arm water heater which has a high recovery rate and a low peak group demand.

Figure 2:
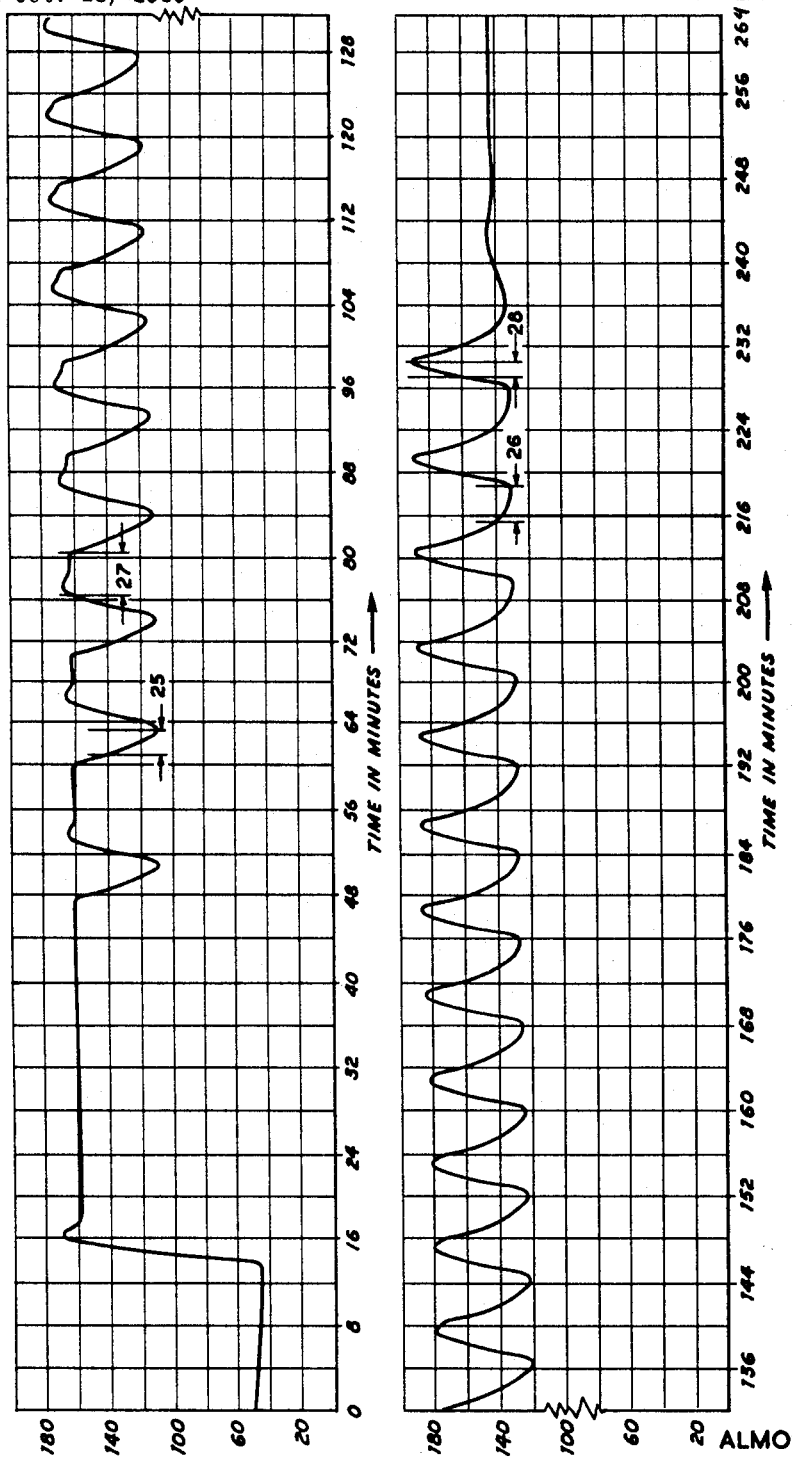

Other objects and advantages of the invention will become apparent from a study of the following specification and the accompanying drawings in which like numbers refer to like parts and in which:

FIG. 1 is a longitudinal sectional view of a side-arm heater embodying the present invention; and FIG. 2 is a graph of temperature vs. time for the side-arm outlet.

Generally speaking, the present invention relates to an electric heater for fluids, such as water, comprising a tank having a side-arm through which fluid in the tank can circulate heated by an electrical heating means in the side-arm. A temperature-sensitive device is associated with the side arm for detecting the temperature of the fluid heated by the electrical heating means. A means for varying the power input to the electrical heating means is associated therewith, controlled by the temperature-sensitive means. The electrical heating means is adapted to function at different power input levels and, advantageously, two power levels are used in the heating means.

In FIG. 1 a tank 10 of the usual kind which may have an approximate 40 gallon capacity has a cold water inlet 11 and a hot water outlet 12. The tank 10 is advantageously glass-lined as shown and is surrounded by the usual insulation 13. A side-arm 14 includes a vertical tube 15, wrapped with insulation 16, and containing an electrical heating element 17 (electrical connections to the element 17 not being shown). A lower conduit 18 and an upper conduit 19 constitute conduit means through which the side-arm 14 communicates with the tank 10 near the top and bottom thereof to form with the tank a closed circuit through which fluid (water) in the tank can circulate. The water circulates through the side-arm 14 by gravity (convection), the hotter, lighter water in the upper conduit 19 being displaced upwardly by the cooler, heavier water in the conduit 18. The heated water enters at the top of the tank 10 through a diffuser 20 of known type. Heating of the water with resultant density differences therein causes a counterclockwise circulation of water in the heater.

A single pole double throw control thermostat 21 is fixed to the conduit 19 just downstream of the side-arm 14 or is located at the top of the vertical tube 15 on the side-arm 14 (as shown) and detects the temperature of the water heated by the heating element 17. The control thermostat 21 is adapted, through power varying means 29, to cycle the power input to the heating element between a first power level when the water at the thermostat is at or below a first temperature and below a second temperature when increasing in temperature and a second power level when the heated fluid is at or above the second temperature and above the first temperature when decreasing in temperature, the second temperature being above the first temperature. More specifically it is contemplated to set the ratio of the first power level to the second power level between about 3:1 and about 4:1. Values of 3.6 and 0.9 kw. have been found satisfactory with a water heater of forty gallon capacity. Connections 30 between the power control thermostat 21 and the power varying means 29 are shown in FIG. 1 along with connections 31 between the power varying means 29 and the heating element 17.

A cutout thermostat 22 is provided at the bottom of the tank 10 to shut off power when all the water in the tank has reached desired temperature and connections 32 are shown between the thermostat 22 and the power varying means 29. A restriction valve 23 is provided in the lower conduit 18 which acts to restrict flow in order that the desired temperature rise can be obtained. A protection device 24, with connections 33 to the power varying means 29, is located at the top of the tank 10 to provide power cut off if the water in the tank becomes over-heated.

In locations where voltage is supplied at two levels, for example 230 and 115 volts, the control thermostat 21 can cycle the power delivered to the heating element between these two voltages, getting a 4:1 ratio between the power inputs. If three-phase power is available, a similar cycling arrangement can be set up, although the ratio of power inputs is different. A resistance element can also be provided which is intermediately tapped, so that the resistance is cycled from one value to the other, while the voltage remains constant.

The temperature differential of the control thermostat 21, i.e. the spread between the first temperature and the second temperature, should lie somewhere between about 20° F. and about 40° F.

FIG. 2 shows graphically the results of a test run conducted with a side-arm water heater as above described, the tank 10 being of 40 gallon capacity, the power levels being 3.6 and 0.9 kw., the temperature differential of the control thermostat being 20°—between 140° F. and 160° F.—and no water being withdrawn from the tank 10 during the test.

The line of the graph records the actual water temperature at the outlet of the side-arm taken by means of a thermocouple positioned in the water. The total number of cycles during the full recovery process was 21. In the first cycle the percent "on" time of the 3.6 kw. input was 75%, which became successively smaller until in the last cycle it was only 24%. Thus the average power input per cycle decreased from 2.9 kw. to 1.5 kw., after which the power input dropped to and remained at 0.9 kw.

The graph of FIG. 2 illustrating the actual water temperature does not, of course illustrate the exact times at which the control thermostat cycled the power to the heating element from one level to the other since there is a time lag between when the water temperature drops to the lower cut-out temperature (140° F.) and when the control thermostat senses that it has reached the lower temperature. This time lag is illustrated by intervals 25 and 26 at two locations on the graph of FIG. 2 with the actual water temperature under-shooting the lower cut-out temperature. There is also a time lag between when the water temperature rises to the upper cut-out temperature (160° F.) and when the control thermostat senses that this upper temperature is reached. This time lag is shown by intervals 27 and 28 at two other locations on the graph with the actual water temperature over-shooting the upper cut-out temperature.

The control thermostat acted to maintain power to the heating element at 3.6 kw. when it detected that the water was at or below 140° F. (the first temperature) and below 160° F. (the second temperature) when the temperature of the water was increasing and the thermostat acted to maintain the power at 0.9 kw. when it detected that the water was at or above 160° F. and above 140° F. when the temperature of the water was decreasing.

One particular advantage of this invention over the usual immersion water heaters has to do with the storage efficiency of a heater. By this term is meant the ability of a water heater to store hot water at the required temperature. For example, with a heater having good storage efficiency, which has been exhausted of heated water, at a given time after the recovery process has begun, the temperature profile down the vertical axis of the tank will show that a certain percentage of the water at the top of the tank has attained the required high temperature which is substantially constant throughout this top portion. Just beneath the top portion there will be a sharp temperature drop, below which the remaining water in the tank will still have the temperature at which it entered the tank. As the recovery progresses, the "junction point" between the upper hot water portion and the lower cold water will gradually creep down the tank, leaving the portion above it at substantially the same high temperature throughout.

A heater with low storage efficiency, on the other hand, will show a more graduated temperature gradient in vertical profile, and will not exhibit the sharply stepped gradient of a high storage efficiency heater. Also, heaters of low storage efficiency tend to overheat the upper layers of the water in the tank, an effect which is undesirable.

A side-arm water heater constructed according to the specifications given above relating to FIG. 2 was tested for vertical temperature profile at intervals after the recovery process had begun and was found to have a very high storage efficiency as compared to standard immersion-type water heaters.

*Delivery performance test*

The "Delivery Performance" of different water heaters is determined by the standard delivery test prescribed in the CEMA specification for "Automatic Electric Storage-Type Water Heaters." This test consists of twelve withdrawals of hot water over a period of 16 hours. At the beginning of the test the unit is fully recovered.

This test was performed on a unit with the specifications described in connection with FIG. 2, and also tested were two ordinary dual-element type water heaters of the same capacity. One of these was a glass-lined tank with strap-on heating elements, and the other was a stone lined tank with immersion heating elements. A comparison of the average temperatures of the water withdrawn at each of the twelve occasions for the three different types of water heaters is given in Table I, following. Temperatures used throughout Table I are in °F. The meaning of the terminology used in Table I is explained in Table II.

The average deviation of each withdrawal temperature from the mean temperature rise for each heater has been computed and is set forth in Table I. For the side-arm water heater constructed according to this invention, the average deviation was found to be only 3.4° F., while for the dual-element type, glass-lined and stone-lined units, it was 4.1° F. and 5.2° F. respectively. Thus, on the basis of this test, the side-arm water heater is the best of the three types, as far as the uniformity of the temperatures of the delivered hot water is concerned. All three units satisfied the delivery performance requirements of the CEMA specifications.

TABLE I

| Withdrawal | | Side-Arm Type | | Dual-Element Type | | | |
|---|---|---|---|---|---|---|---|
| | | | | Strap-on, Glass-Lined | | Immersion, Stone-Lined | |
| Time (hr.) | Volume (gal.) | Average Temperature | Deviation from Mean Temperature | Average Temperature | Deviation from Mean Temperature | Average Temperature | Deviation from Mean Temperature |
| 0 | 11 | 149.5 | 10.3 | 138 | 2.9 | 140 | −1.5 |
| 1 | 5 | 140.5 | 1.3 | 138 | 2.9 | 139 | −2.5 |
| 1.5 | 17 | 138.5 | −0.7 | 137.5 | 2.4 | 137 | −4.5 |
| 2.5 | 14 | 135.0 | −4.2 | 123 | −12.1 | 137.5 | −4.0 |
| 3.5 | 13 | 125.5 | −13.7 | 136.5 | 1.4 | 136 | −5.5 |
| 4.5 | 4 | 142.5 | 3.3 | 134.5 | −0.6 | 146 | 4.5 |
| 5.5 | 4 | 140.5 | 1.3 | 138 | 2.9 | 148.5 | 7.0 |
| 6.5 | 7 | 142.0 | 2.8 | 139.5 | 4.4 | 149 | 7.5 |
| 10.5 | 3 | 140.5 | 1.3 | 137 | 1.9 | 148 | 6.5 |
| 11.5 | 4 | 140.0 | 0.8 | 130 | −5.1 | 147 | 5.5 |
| 13.0 | 5 | 138.0 | −1.2 | 141 | 5.9 | 141 | −0.5 |
| 16.0 | 13 | 138.0 | −1.2 | 128 | −7.1 | 128.5 | −13.0 |
| Mean Withdrawal Temp. | | 139.2 | | 135.1 | | 141.5 | |
| Mean Temp. Rise | | 102.2 | | 96.6 | | 104.0 | |
| Mean Deviation | | 3.42 | | 4.14 | | 5.25 | |
| Maximum Temp. Variation | | 24.0 | | 18.0 | | 20.5 | |
| Mean Weighted Deviation | | 4.34 | | 4.68 | | 5.45 | |

TABLE II

| Terminology | Explanation |
|---|---|
| Withdrawal Time | Time interval between consecutive hot water withdrawals. |
| Average Temperature | The time average of the water temperature of a withdrawal, obtained by integrating the temperature in the hot water outlet, over the period of withdrawal, with respect to time. |
| Deviation from Mean Temperature | The difference between the average temperature of a withdrawal and the mean withdrawal temperature. |
| Mean Withdrawal Temperature | The arithmetic mean of the average temperatures obtained for each withdrawal. |
| Mean Temperature Rise | The difference between the mean Withdrawal temperature and the cold water inlet temperature. |
| Mean Deviation | The arithmetic mean of the absolute values of deviations from mean temperature obtained for each withdrawal. |
| Maximum Temperature Variation | The sum of the absolute values of the maximum positive and maximum negative deviations. |
| Mean Weighted Deviation | Obtained by multiplying the deviations from mean temperature by the volume of the withdrawals, summing up the absolute values of these products and dividing the sum by the total withdrawal. |

It should be noted that all tests intended to evaluate a water heater's delivery characteristics are somewhat arbitrary. The time interval between consecutive withdrawals is usually one hour. This appears convenient for the dual-element water heater, whose upper element recovery time is about one hour also. Thus water stored in the upper quarter of the tank is always given a chance to reach the required temperature, even if the tank were completely depleted of stored hot water at the end of the previous withdrawal.

Is this withdrawal occurs 20 minutes sooner, however, the prior art dual-element water heater has an unsatisfactory performance. However, if the same test is applied to a side-arm water heater according to this invention, it is found that the side-arm water heater can produce about 6 gallons of hot water in 40 minutes, whereas the prior art dual-element water heater during the same length of time can produce only 10 gallons of lukewarm water. This difference in performance is directly related to the storage efficiency of the heater, as discussed above.

What I claim as my invention is:

1. An electric water heater comprising a tank having only a single side-arm through which water in the tank can circulate, only a single electrical heating element in the side-arm, a temperature-sensitive device for detecting the temperature of water heated by said electrical heating element at the downstream end of said side-arm, means controlled by the temperature-sensitive device for cycling the power input to and energizing the electrical heating element between a first power level when the heated water is detected as being at or below a first temperature and below a second temperature when increasing in temperature and a second power level when the heated water is detected as being at or above the second temperature and above the first temperature when decreasing in temperature, the second temperature being above the first temperature, and a cutout device at the bottom of the tank to shut off power when all water in the tank has reached desired temperature.

2. An electric water heater as claimed in claim 1 in which the ratio of the first power level to the second power level is between about 3:1 and about 4:1.

3. An electric water heater as claimed in claim 1 in which the difference between the first and second temperatures is between about 20° F. to about 40° F.

4. An electric water heater as claimed in claim 1 in which the temperature-sensitive device is a thermostat having a differential of about 25° F.

5. An electric water heater comprising a tank, only a single side-arm on said tank, conduit means through which the side-arm communicates with the tank near the top and bottom thereof to form therewith a closed circuit through which water in the tank can circulate, a thermostat located at the downstream end of the side-arm for detecting water temperature, only a single electrical heating element in the side-arm, and means controlled by the thermostat for cycling the power input to and energizing the electrical heating element between a first power level when the thermostat detects that the water is at or below a first temperature and below a second temperature when the temperature of the water is increasing and a second power level when the thermostat detects that the water is at or above the second temperature and above the first temperature when the temperature of the water is decreasing, the second temperature being above the first temperature and a cutout thermostat at the bottom of the tank to shut off power when all water in the tank has reached desired temperature.

6. An electric water heater as claimed in claim 5 in which the ratio of the first power level to the second power level is approximately 4:1, and in which the spread between the first and the second temperature is between about 20° F. and about 40° F.

References Cited

UNITED STATES PATENTS

| 1,269,053 | 6/1918 | Clark et al. | 219—321 |
| 1,560,528 | 11/1925 | Baum | 219—328 X |
| 1,620,745 | 3/1927 | Wainwright | 219—304 |
| 1,671,592 | 5/1928 | Kercher et al. | 219—306 X |
| 1,715,687 | 6/1929 | Vaughan | 219—306 |
| 2,044,611 | 6/1936 | Hodges | 219—331 |
| 2,519,920 | 8/1950 | Miner | 219—306 X |
| 2,744,184 | 5/1956 | Rowley | 219—297 |
| 2,848,588 | 8/1958 | Hackman | 219—330 X |

ANTHONY BARTIS, *Primary Examiner.*